(12) United States Patent
Haberstock et al.

(10) Patent No.: US 11,022,157 B2
(45) Date of Patent: Jun. 1, 2021

(54) COOLING-PRIORITIZATION VALVE FOR A HYDRAULIC SYSTEM OF A MOTOR VEHICLE TRANSMISSION

(71) Applicant: ZF Friedrichshafen AG, Friedrichshafen (DE)

(72) Inventors: Alexander Haberstock, Ravensburg (DE); Armin Haugg, Friedrichshafen (DE); Thilo Schmidt, Meckenbeuren (DE); Markus Herrmann, Scheidegg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/678,448

(22) Filed: Nov. 8, 2019

(65) Prior Publication Data
US 2020/0149562 A1 May 14, 2020

(30) Foreign Application Priority Data
Nov. 9, 2018 (DE) ...................... 10 2018 219 122.0

(51) Int. Cl.
*F15B 21/0423* (2019.01)
*F16H 61/02* (2006.01)
*F16K 49/00* (2006.01)

(52) U.S. Cl.
CPC ..... *F15B 21/0423* (2019.01); *F16H 61/0267* (2013.01); *F16H 61/0276* (2013.01); *F16K 49/00* (2013.01); *F16H 2061/0279* (2013.01)

(58) Field of Classification Search
CPC ............ F15B 21/0423; F15B 2211/611; F15B 2211/62; F16H 61/0267; F16H 57/0446; F16H 57/0412
See application file for complete search history.

(56) References Cited

U.S. PATENT DOCUMENTS 5,347,886 A * 9/1994 Mainquist ........... F16H 57/0413
475/159
6,460,655 B2 10/2002 Miller

FOREIGN PATENT DOCUMENTS

| DE | 102013001928 A1 | 8/2014 | |
| DE | 102014216648 A1 | 3/2015 | |
| WO | WO 2014/117922 | 8/2014 | |
| WO | WO-2014117922 A1 * | 8/2014 | ......... F16H 61/0021 |

(Continued)

OTHER PUBLICATIONS

German Search Report DE102018219122.0, dated May 23, 2019. (12 pages).

*Primary Examiner* — Thomas E Lazo

(74) *Attorney, Agent, or Firm* — Dority & Manning, P.A.

(57) ABSTRACT

A cooling prioritization valve (5) for a hydraulic system (4) of a motor vehicle transmission (3) includes a valve housing (6), a valve slide (7), an inlet (18), an outlet (15), and a further outlet (21). A secondary system pressure circuit (39) of the hydraulic system (4) can be connected to the inlet (18), a cooler (54) can be connected to the outlet (15) or to the further outlet (21), and a suction loading (44) can be connected to the outlet (15) or to the further outlet (21). In a starting position, the inlet (18) is not connected either to the outlet (15) or to the further outlet (21). In a first control position, the inlet (18) is connected to the outlet (15). In a second control position, the inlet (18) is connected to the outlet (15) and the further outlet (21).

10 Claims, 6 Drawing Sheets

(56) References Cited

FOREIGN PATENT DOCUMENTS

| WO | WO 2015/043586 | 4/2015 |
| WO | WO 2018/055197 | 3/2018 |

\* cited by examiner

COOLING-PRIORITIZATION VALVE FOR A HYDRAULIC SYSTEM OF A MOTOR VEHICLE TRANSMISSION

CROSS-REFERENCE TO RELATED APPLICATION

The present application is related and has right of priority to German Patent Application No. 10 2018 219 122.0 filed on Nov. 9, 2018, the entirety of which is incorporated by reference for all purposes.

FIELD OF THE INVENTION

The invention relates generally to a cooling prioritization valve for a hydraulic system of a motor vehicle transmission. Moreover, the invention relates generally to a hydraulic system that includes the cooling prioritization valve, a motor vehicle transmission the includes the hybrid system, and a motor vehicle that includes the motor vehicle transmission.

BACKGROUND

Hydraulic systems, in particular for automatic transmissions of motor vehicles, are known, which include a pump system, a high pressure circuit (primary system pressure circuit) and a low pressure circuit (secondary system pressure circuit), as well as suction loading. Suction loading is understood to be a return of an excess flow delivered by the pump to the suction side of the pump. The pump system can be designed, for example, as a double-stroke vane pump having a rotational speed-dependent volumetric output flow.

The secondary system pressure circuit can be divided into a section for cooling and lubricating the transmission and into a section for cooling a starting component. A certain flow of oil is utilized by the secondary system pressure circuit for cooling the integrated starting component, wherein the amount of oil can be controlled by a closed-loop system with the aid of a cooling valve. The amount of oil can be indirectly controlled by a closed-loop system via the variable pressure of the cooling valve. A splitting ratio of the cooling oil flows can be determined, in this case, on the basis of a ratio of an orifice, which is arranged in front of the integrated starting component, and a further orifice, which is arranged in front of the cooler.

The integrated starting component must be cooled to a great extent, in particular during starting processes. In this case, the output speeds in the transmission are very low, such that a high cooler through-flow (or lubrication) is not demanded. The cooler through-flow cannot be reduced in this case (beyond the splitting ratio) without also reducing the cooling of the integrated starting component. The secondary requirement has effects on the size of the oil pump (ccm per revolution), since a sufficient amount of secondary oil must be made available in the starting situations in order to provide the desired cooling of the integrated starting component.

SUMMARY OF THE INVENTION

Example aspects of the present invention improve the cooling of an integrated starting component.

According to example aspects of the present invention, the supply of cooling oil to an integrated starting component is improved with the aid of an additional collar on a system pressure valve for the secondary system pressure circuit of a hydraulic system of a motor vehicle transmission. The system pressure valve can be designed as a pressure control valve. This system pressure valve is referred to in the following as a "cooling prioritization valve". The cooling prioritization valve contributes to counteracting an enlargement of the pump or to reducing the size of the pump. Therefore, the consumption of the hydraulic system can be further reduced. There is no need to provide an additional pressure regulator or an additional valve in order to control the cooler through-flow by way of a closed-loop system in this case.

In this sense, according to a first example aspect of the invention, a cooling prioritization valve for a hydraulic system of a motor vehicle transmission is made available. The cooling prioritization valve includes a valve housing, a valve slide, an inlet, an outlet, and a further outlet.

A secondary system pressure circuit of the hydraulic system can be connected to the inlet. Therefore, pressurized oil from the secondary system pressure circuit can be fed to the cooling prioritization valve. Moreover, the secondary system pressure circuit can be connected to an integrated starting component, for example, via a cooling valve and via an orifice. In this case, for example, the secondary system pressure circuit can be connected to an input-side connection of the cooling valve. The orifice can be connected, on the one hand, to an output-side connection of the cooling valve and, on the other hand, to the integrated starting component.

A cooler can be connected to the inlet or to the further inlet, in particular via an orifice, which is connected, on the one hand, to the secondary system pressure circuit and, on the other hand, to the cooler. A suction loading, which is connected to a suction side of a pump or to a pump system of the hydraulic system, can also be connected to the outlet or to the further outlet. Therefore, either the cooler can be connected to the outlet and the suction loading can be connected to the further outlet, or the suction loading is connected to the outlet and the cooler is connected to the further outlet. The connection "to the cooler" and "to the suction loading" outlets can therefore be interchanged, which simplifies the installation situation and can be easily implemented by changing the control times at the valve slide. The suction loading is connected, in particular, to a suction side of a pump of the hydraulic system. The suction loading can include a line, which leads to an inlet of the pump or of the pump system. Oil can be additionally fed (in addition to a supply via an oil tank) to the pump or to the pump system via this inlet.

The cooling prioritization valve is configured for displacing the valve slide within the valve housing into a starting position, into a first control position, and into a second control position.

In the starting position, the inlet is not connected either to the outlet or to the further outlet. The feature "connected" is understood to mean, in particular, that the particular interconnected elements are connected to each other in a hydraulically conductive manner, i.e., a hydraulic fluid, in particular oil, can flow from the one element to the other element and, if necessary, vice versa. The feature "disconnected" or "not connected to one another" can be understood to mean, in particular, that the particular elements that are disconnected from one another are not connected to one another in a hydraulically conductive manner, i.e., no hydraulic fluid, in particular oil, can flow from the one element to the other element and, if necessary, vice versa.

When the valve slide is in the starting position, pressurized oil can, in fact, enter the cooling prioritization valve, in particular a valve pocket of the cooling prioritization valve, via the inlet. However, the oil cannot leave the cooling prioritization valve via the outlet and the further outlet in order to be fed to the cooler and/or to the suction loading. Therefore, the entire oil flow of the secondary system pressure circuit (or at least a better part thereof) can be utilized for cooling the integrated starting component. For this purpose, a section of the secondary system pressure circuit can be directed past the cooling prioritization valve to a cooling valve, which is connected to the integrated starting component for the cooling thereof.

In the first control position, however, the inlet is connected to the outlet. As a result, pressurized oil from the secondary system pressure circuit can now leave the cooling prioritization valve via the outlet in order to be fed to the cooler or to the suction loading, depending on which of the two elements is connected to the outlet.

In the second control position, the inlet is connected both to the outlet and to the further outlet. As a result, pressurized oil from the secondary system pressure circuit can now leave the cooling prioritization valve via the outlet and the further outlet in order to be fed to the cooler as well as to the suction loading.

In a first example embodiment, the valve housing includes three valve collars, which each form a valve pocket. In this case, the inlet, the outlet, and the further outlet are each arranged on one of the valve collars and are each connected to one of the valve pockets.

The valve collars can be designed to be hollow inside and, as a result, can each form a valve pocket. The valve pockets described in the present application can be cavities within the valve housing. The cavities can be filled by the valve slide in the area of the axial bore hole of the valve housing. The valve pockets can extend, in a radial direction of the valve, further outward than the axial bore hole of the valve housing extending in a longitudinal direction of the valve. The axial bore hole is utilized, in particular, for guiding the valve slide, including a piston rod and pistons of the valve slide, within the valve housing. The valve pockets can form an, in particular, toroidal, pressure chamber, which protrudes from the axial valve bore in the radial direction of the cooling valve. This pressure chamber can be filled with oil and, in fact, in particular even when a piston of the valve slide closes the pressure chamber toward the radially further inward lying axial bore hole of the valve body. The axial valve bore can correspond to the particular diameter of the valve slide (or pistons of the valve slide) or can have a slightly larger diameter than the valve slide (or pistons of the valve slide), so that the valve slide can be displaced back and forth within the axial valve bore, in the axial direction of the valve, with as little friction and wear as possible. Moreover, the valve pockets can each be connected to one or more ports of the valve. One or more valve pockets can be disconnected from each other or can connected to each other with the aid of the valve slide (in particular, with the aid of pistons of the valve slide).

The first example embodiment makes it possible, due to the three valve collars including the valve pockets and ports, to improve the supply of the integrated starting component. As compared to system pressure valves for the secondary system pressure circuit known from the prior art, the cooling prioritization valve according to the first example embodiment of the present invention includes, in particular, an additional valve collar, with the aid of which a prioritization of the cooling of the integrated starting component can be established. Due to the three valve collars including the valve pockets and ports, the entire secondary amount is initially directed to the cooling of the integrated starting component. Only when a specified amount of cooling oil of the integrated starting component has been reached does a sufficient amount of pressure build up in the secondary circuit in order to displace the valve slide into the first control position and to open a leading edge of a piston of the valve slide, in particular, to the cooler. If the cooling of the integrated starting component is reduced after the starting process, more and more oil can flow to the cooler. As soon as the cooler has been saturated, the valve slide can be displaced into the second control position and a leading edge of a further piston of the valve slide can open the inlet having the further outlet leading, in particular, to the suction loading, in order to deliver an excess amount of oil in the direction of the suction loading. The additional collar on the cooling prioritization valve constructionally represents only a slightly greater amount of effort and also utilizes barely any installation space. Moreover, the additional valve collar can be cost-effectively implemented. The efficiency of the hydraulic system can also be increased. If, for example, fifteen liters (15 L) of oil per minute are to be made available for cooling the integrated starting component, an additional oil flow does not need to be made available for the cooler and the suction loading, as is necessary from the prior art.

In a further example embodiment, a piston rod of the valve slide includes a piston and a further piston, which is arranged adjacent to the piston and at an axial distance therefrom. In the starting position, a valve pocket connected to the inlet is disconnected, via the piston and the further piston, from a valve pocket connected to the outlet as well as from a valve pocket connected to the further outlet. In the first control position, the valve pocket connected to the inlet is connected to the valve pocket connected to the outlet and is disconnected, via the further piston, from the valve pocket connected to the further outlet. In the second control position, the valve pocket connected to the inlet is connected to the valve pocket connected to the outlet as well as to the valve pocket connected to the further outlet.

Moreover, the valve slide can be preloaded in the starting position with the aid of a restoring element. The restoring element can generate a preload force. Due to the restoring force, the valve slide tends to remain in the starting position of the valve slide. In particular, due to the preload force, the valve slide can remain in the starting position for as long as a pilot pressure remains below the preload force. For example, the restoring element can act on a cup-shaped piston. The cup-shaped piston can form an interior space and an inner surface, for example, a circular surface. The inner surface can extend perpendicularly to a possible displacement direction of the valve slide. The restoring element can include, for example, a spring. The spring can be arranged, for example, within the interior space of the cup-shaped piston and can generate a restoring force in the form of a spring force, which acts axially, in the direction of the outlets, on the inner surface.

According to a second example aspect of the invention, a hydraulic system for motor vehicle transmission is made available. The hydraulic system includes an above-described cooling prioritization valve according to the first example aspect of the invention, a secondary system pressure circuit, a cooler, and a suction loading, which is connected to a suction side of a pump of the hydraulic system. The secondary system pressure circuit is connected to the inlet. Moreover, according to a first example alternative, the cooler can be connected to the outlet and the suction loading can be connected to the further outlet of the cooling prioritization valve. According to a second example alternative, the suction loading can be connected to the outlet and the cooler can be connected to the further outlet. Moreover, an integrated starting component is connected to the secondary system pressure circuit, bypassing the cooling prioritization valve. The feature "bypassing" is to be understood to mean that a line section of the secondary system pressure circuit of the hydraulic system leads to the integrated starting component without a hydraulic intermediate connection of the cooling prioritization valve.

The above-described example embodiments make an oil flow available, in particular, to the cooler only when the cooling of the integrated starting component has been completely saturated. As a result, the lubrication (which branches off, in particular, after the cooler) is also decoupled. In order to make a minimal lubrication available, in one embodiment, the hydraulic system includes a bypass orifice, via which the secondary system pressure circuit is connected to the cooler and to a lubrication arranged, in particular, downstream from the cooler. As a result, the bypass orifice makes it possible to direct an amount of oil to the cooler and to the lubrication and, therefore, to prevent a dry-running of the transmission.

In this connection, in one example embodiment, the cooler can be connected to the outlet and the suction loading can be connected to the further outlet, wherein the bypass orifice is connected, on the one hand, to an additional outlet, which is connected to the valve pocket that is connected to the inlet. On the other hand, the bypass orifice is connected to a line section leading to the cooler, wherein another orifice can be arranged in front or upstream of the cooler.

In an alternative example embodiment, the suction loading is connected to the outlet and the cooler is connected to the further outlet, wherein the bypass orifice is connected, on the one hand, to the secondary system pressure circuit, and wherein the bypass orifice is connected, on the other hand, to a line section leading to the cooler, wherein another orifice can be arranged in front or upstream of the cooler.

With respect to the displacement forces of the valve slide in relation to the valve housing, the valve slide can be displaced within the valve body in the direction of the starting position with the aid of a preload force of the restoring element and with the aid of a hydraulic pilot force. The hydraulic pilot force can be induced by a pressure prevailing within a first system pressure circuit of the hydraulic system, which can act upon a same surface as the restoring element. In the opposite direction, the valve slide can be displaced within the valve body in the direction of the first control position and the second control position with the aid of a hydraulic compressive force, which is induced by a pressure prevailing within the second system pressure circuit.

According to a third example aspect of the invention, a motor vehicle transmission is made available, in particular, a motor vehicle automatic transmission. The motor vehicle transmission includes a hydraulic system according to the second example aspect of the invention.

According to a fourth example aspect of the invention, a motor vehicle is made available, which includes a motor vehicle transmission according to the third example aspect of the invention.

BRIEF DESCRIPTION OF THE DRAWINGS

Exemplary embodiments of the invention are explained in greater detail in the following with reference to the diagrammatic drawing, wherein identical or similar elements are provided with the same reference signs. Wherein.

DETAILED DESCRIPTION

Figure 1:
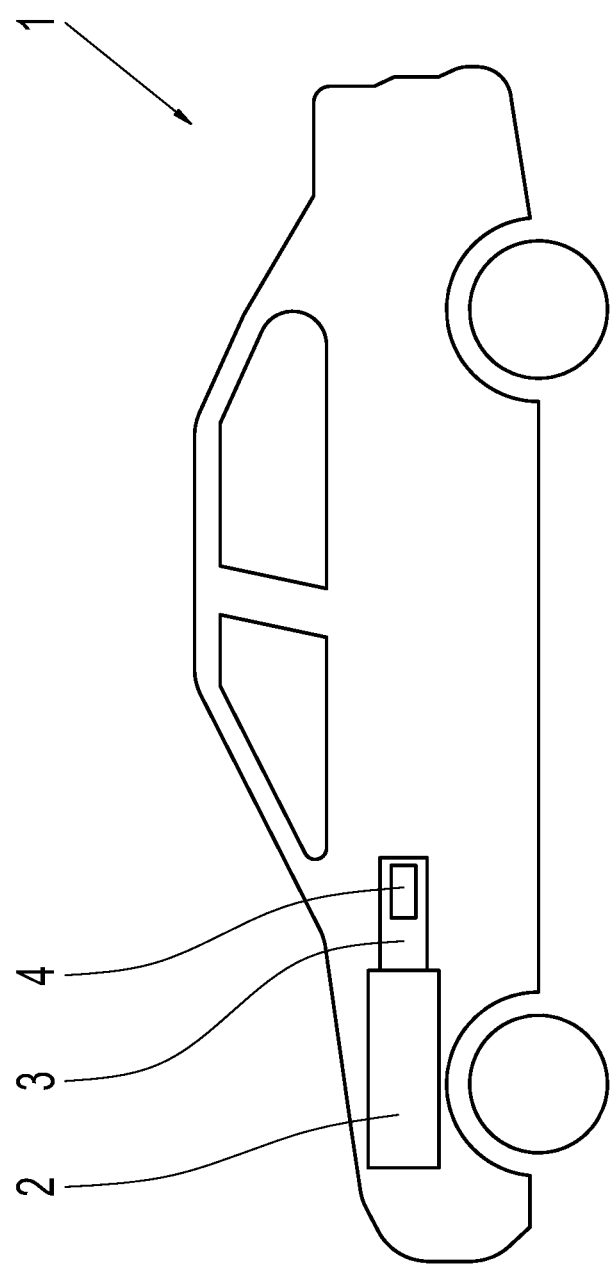
FIG. 1 shows a vehicle comprising an engine and an automatic transmission including a hydraulic system.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a motor vehicle 1, specifically a passenger car in the example shown. The motor vehicle 1 includes an internal combustion engine 2, which drives the motor vehicle 1 via a motor vehicle transmission in the form of an automatic transmission 3. The automatic transmission includes a hydraulic system 4.

Figure 2:
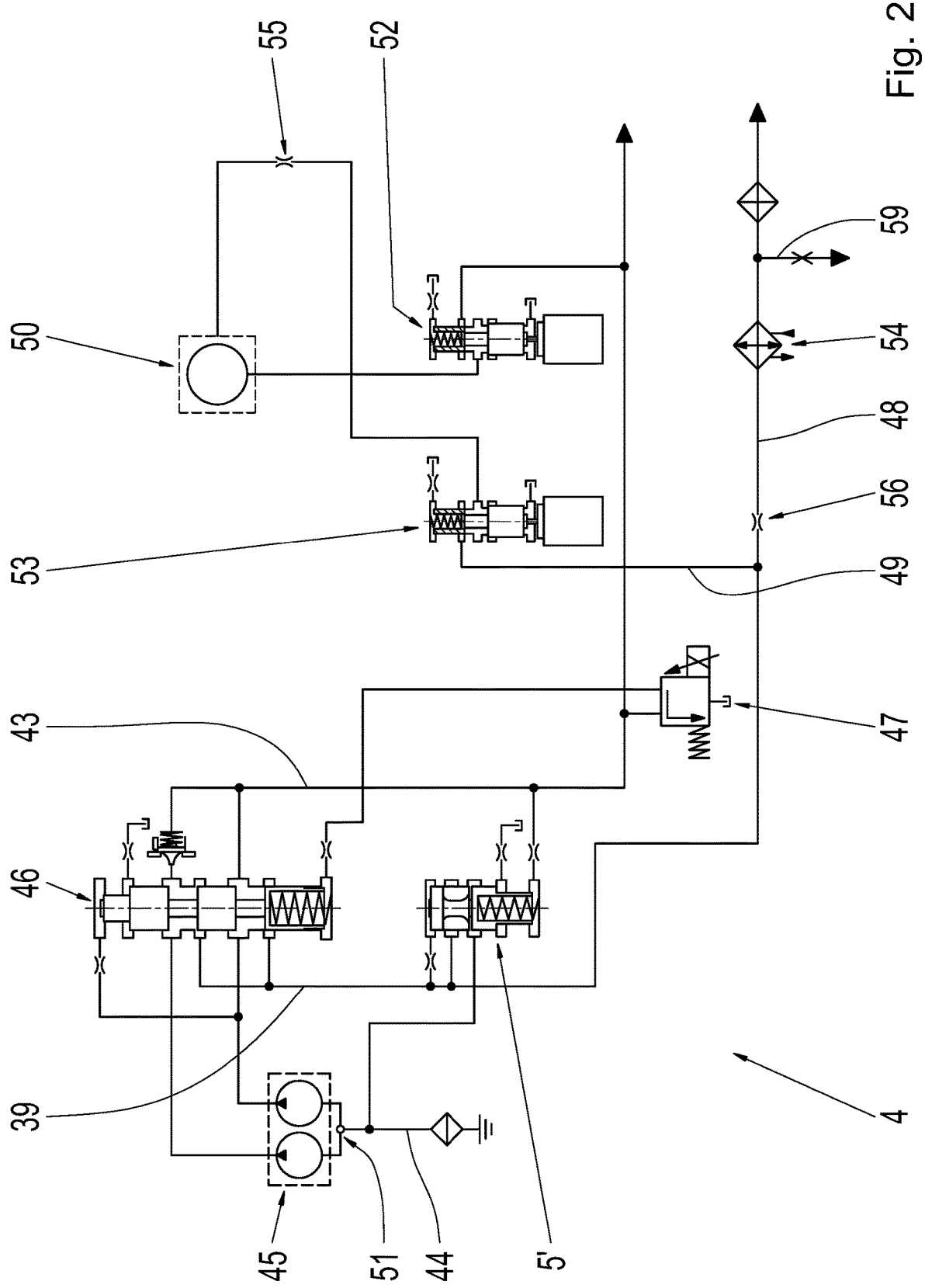
FIG. 2 shows a hydraulic circuit diagram of a portion of a hydraulic system comprising a known secondary system pressure valve for use in the automatic transmission according to FIG. 1.

FIG. 2 shows a portion of a circuit diagram of a hydraulic system 4 for the automatic transmission according to FIG. 1. The hydraulic system 4 includes a known secondary system pressure valve 5', which can be replaced by a cooling prioritization valve 5 according to example aspects of the invention, which is represented in enlarged form, for example, in FIG. 3, 4, 5, or 6. The configuration of the cooling prioritization valve 5 will initially be described in greater detail in the following. Thereafter, the further elements of the hydraulic system 4 will be discussed. Building on that, the mode of operation of the cooling prioritization valve 5 and the periphery will be described in conjunction with the hydraulic system 4.

Figure 3:
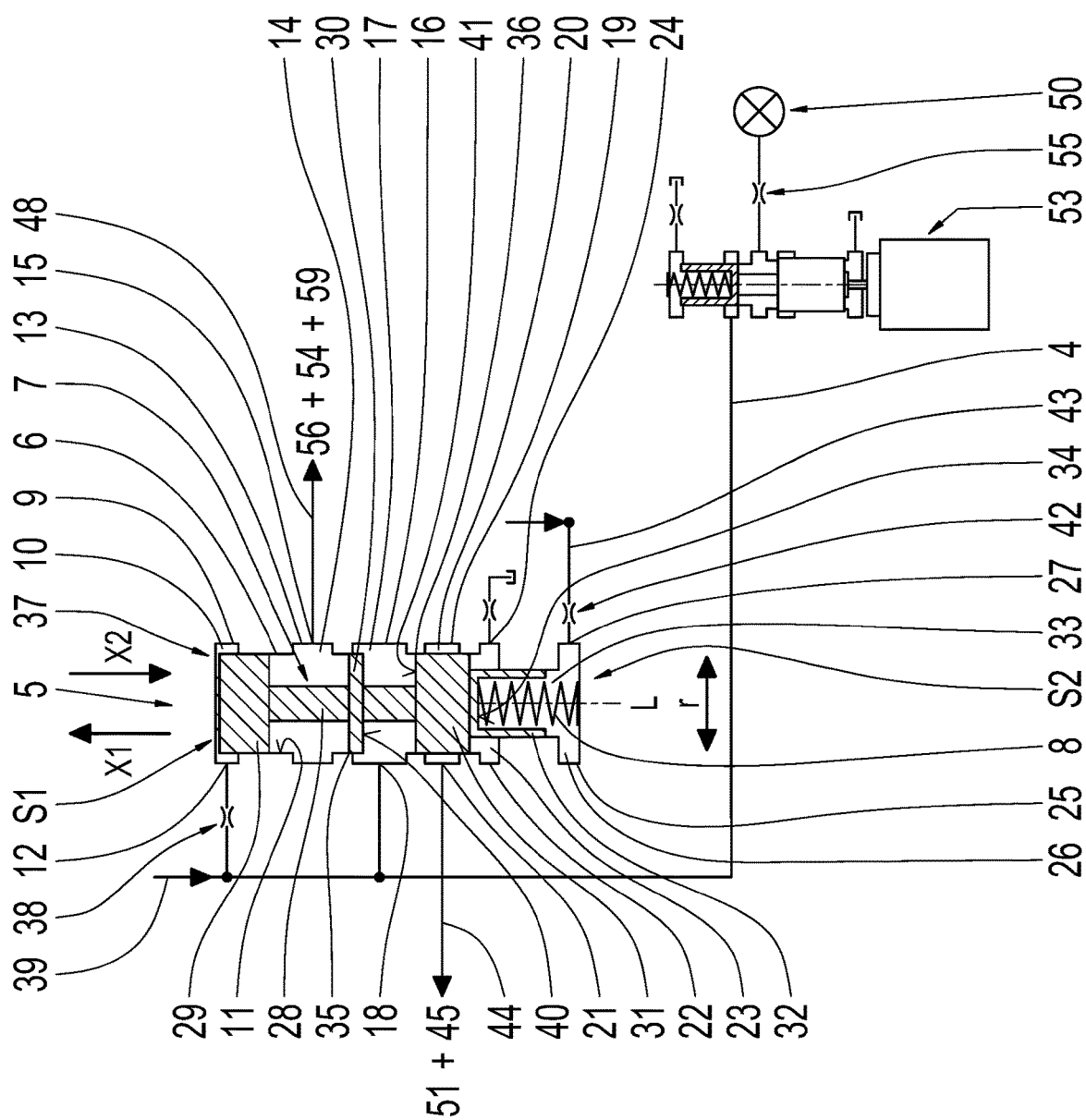
FIG. 3 shows a first exemplary embodiment of a cooling prioritization valve according to the invention for the hydraulic system according to FIG. 2, wherein the cooling prioritization valve according to FIG. 3 can replace the secondary system pressure valve according to FIG. 2.

FIG. 3 shows the cooling prioritization valve 5, which includes a valve housing 6 and a valve slide 7. The valve slide 7 can be displaced back and forth in opposite axial directions x1 (first direction) and x2 (second direction) within the valve housing 6 along a longitudinal axis L of the cooling prioritization valve 6. The valve slide 7 is preloaded in a starting position shown in FIG. 3 with the aid of a restoring element in the form of a spring element 8. The spring element 8 is arranged in the area of a second face end S2 of the cooling prioritization valve 5.

In the area of a first face end S1, which is located on an opposite side of the cooling prioritization valve 5, the cooling prioritization valve 5 includes a first valve collar 9. The first valve collar 9 can be formed by the valve housing 6. The first valve collar 9 is designed to be hollow inside and forms a first valve pocket 10, which extends, in a radial direction r of the cooling prioritization valve 5, further outward than an axial bore hole 11 of the valve housing 6 extending in the longitudinal direction L of the cooling prioritization valve 5. Moreover, the valve housing 6 includes a first port 12 in the area of the first valve pocket 10, which can be connected to the first valve pocket 10. The first port 12 can be utilized, in particular, as an inlet for oil, so that oil can fill the first valve pocket 10.

The cooling prioritization valve 5 includes a second valve collar 13 arranged adjacent to the first valve collar 9 and at an axial distance from the first valve collar 9 in the second direction x2. The second valve collar 13 can be formed by the valve housing 6. The second valve collar 13 is designed to be hollow inside and forms a second valve pocket 14, which extends, in the radial direction r of the cooling prioritization valve 5, further outward than the axial bore hole 11 of the valve housing 6 extending in the longitudinal direction L of the cooling prioritization valve 5. Moreover, the valve housing 6 includes a second port 15 in the area of the second valve pocket 14, which can be connected to the second valve pocket 14. The second port 15 can be utilized, in particular, as an outlet for oil, so that oil can be discharged from the second valve pocket 14.

The cooling prioritization valve 5 includes a third valve collar 16 arranged adjacent to the second valve collar 13 and at an axial distance from the second valve collar 13 in the second direction x2. The third valve collar 16 can be formed by the valve housing 6. The third valve collar 16 is designed to be hollow inside and forms a third valve pocket 17, which extends, in the radial direction r of the cooling prioritization valve 5, further outward than the axial bore hole 11 of the valve housing 6 extending in the longitudinal direction L of the cooling prioritization valve 5. Moreover, the valve housing 6 includes a third port 18 in the area of the third valve pocket 17, which can be connected to the third valve pocket 17. The third port 18 can be utilized, in particular, as an inlet for oil, so that oil can fill the third valve pocket 17.

The cooling prioritization valve 5 includes a fourth valve collar 19 arranged adjacent to the third valve collar 16 and at an axial distance from the third valve collar 16 in the second direction x2. The fourth valve collar 19 can be formed by the valve housing 6. The fourth valve collar 19 is designed to be hollow inside and forms a fourth valve pocket 20, which extends, in the radial direction r of the cooling prioritization valve 5, further outward than the axial bore hole 11 of the valve housing 6 extending in the longitudinal direction L of the cooling prioritization valve 5. Moreover, the valve housing 6 includes a fourth port 21 in the area of the fourth valve pocket 20, which can be connected to the fourth valve pocket 20. The fourth port 21 can be utilized, in particular, as an outlet for oil, so that oil can be discharged from the fourth valve pocket 20.

The cooling prioritization valve 5 includes a fifth valve collar 22 arranged adjacent to the fourth valve collar 19 and at an axial distance from the fourth valve collar 19 in the second direction x2. The fifth valve collar 22 can be formed by the valve housing 6. The fifth valve collar 22 is designed to be hollow inside and forms a fifth valve pocket 23, which extends, in the radial direction r of the cooling prioritization valve 5, further outward than the axial bore hole 11 of the valve housing 6 extending in the longitudinal direction L of the cooling prioritization valve 5. Moreover, the valve housing 6 includes a fifth port 24 in the area of the fifth valve pocket 23, which can be connected to the fifth valve pocket 23. The fifth port 24 can be utilized, in particular, as an outlet for oil, so that oil can be discharged from the fifth valve pocket 23.

The cooling prioritization valve 5 includes a sixth valve collar 25 arranged adjacent to the fifth valve collar 22 and at an axial distance from the fifth valve collar 22 in the second direction x2. The sixth valve collar 25 can be formed by the valve housing 6. The sixth valve collar 25 is designed to be hollow inside and forms a sixth valve pocket 26, which extends, in the radial direction r of the cooling prioritization valve 5, further outward than the axial bore hole 11 of the valve housing 6 extending in the longitudinal direction L of the cooling prioritization valve 5. Moreover, the valve housing 6 includes a sixth port 27 in the area of the sixth valve pocket 26, which can be connected to the sixth valve pocket 26. The sixth port 27 can be utilized, in particular, as an inlet for oil, so that oil can fill the sixth valve pocket 26.

The valve slide 7 includes a piston rod 28. Multiple pistons 29, 30, 31, and 32 are arranged on the piston rod 28. The individual pistons 29, 30, 31, and 32 are connected, in particular fixedly, to the piston rod 28. The pistons 29, 30, 31, and 32 extend further outward than the piston rod 28 in the radial direction r of the valve slide 7. The diameters of the pistons 29, 30, 31, and 32 are selected in such a way that the pistons 29, 30, 31, and 32 can be moved back and forth in the longitudinal direction L within the axial bore hole 11 of the valve housing 6 and, in particular, in a (largely) sealing and frictionless manner. The valve pockets 10, 14, 17, 20, 23, and 26, in turn, extend further outward than the pistons 29, 30, 31, and 32 in the radial direction r of the valve slide 7.

A first piston 29 is arranged in the area of the first face end S1. Moreover, a second piston 30 is arranged adjacent to the first piston 29 and at an axial distance from the first piston 29 in the second direction x2. Moreover, a third piston 31 is arranged adjacent to the second piston 30 and at an axial distance from the second piston 30 in the second direction x2. Finally, in the area of the second face end S2, a fourth piston 32 is arranged adjacent to the third piston 31. The third piston 31 and the fourth piston 32 can be designed as one piece or as two pieces.

The first piston 29 seals off the first valve pocket 10 with respect to the second valve pocket 14 regardless of the position of the valve slide 7 in relation to the valve body 6 (i.e., in the starting position, in the first control position, and in the second control position, as described in the following), and so there is no connection between the first valve pocket 10 and the second valve pocket 14. As a result, the first port 12 is not connected to the second port 15, either.

The fourth piston 32 seals off the sixth valve pocket 26 with respect to the fifth valve pocket 23 in a similar way, regardless of the switching position of the valve slide 7 in relation to the valve body 6 (i.e., in the starting position, in the first control position, and in the second control position, as described in the following), and so there is no connection between the sixth valve pocket 26 and the fifth valve pocket 23. As a result, the sixth port 27 is not connected to the fifth port 24, either.

The fourth piston 32 is designed to be cup-shaped and forms an interior space 33 as well as an inner hydraulically effective surface 34, which extends in the radial direction r (and, therefore, transversely to the longitudinal direction L). The spring element 8 generates a preload force, which acts in the first direction x1 on the inner hydraulically effective surface 34 of the fourth piston 32. The sixth valve pocket 26 is connected to the interior space 33 of the fourth piston 32.

In the example embodiment of the valve slide 7 represented in FIG. 3, the valve slide 7, preloaded by the spring element 8, is in a first end position, in which the first piston 29 is located within the first valve pocket 10. In the starting position, the second piston 30 seals off the third valve pocket 17 with respect to the second valve pocket 14, and so the third valve pocket 17 is not connected to the second valve pocket 14. As a result, the third port 18 (inlet) is not connected to the second port 15 (outlet), either.

Moreover, in the starting position of the valve slide 7 represented in FIG. 3, the third piston 31 overlaps the fourth valve pocket 20. In so doing, the third piston 31 seals off the fourth valve pocket 20, and so the fourth valve pocket 20 is not connected either to the third valve pocket 17 or to the fifth valve pocket 23. As a result, the fourth port 21 (further outlet) is also not connected either to the third port 18 (inlet) or to the fifth port 24.

The valve slide 7 can be moved in the second direction x2, so that the valve slide 7 moves out of the starting position according to FIG. 3 and assumes a first control position. In the first control position, the second piston 30 enables a connection between the second valve pocket 14 and the third valve pocket 17 via a leading edge 35 of the second piston 30. As a result, the third port 18 (inlet) is connected to the second port 15 (outlet).

The geometry of the valve slide 7 is configured in such a way that the third piston 31 still overlaps the fourth valve pocket 20 even in the first control position of the valve slide 7. In so doing, the third piston 31 continues to seal off the fourth valve pocket 20, and so the fourth valve pocket 20 is not connected either to the third valve pocket 17 or to the fifth valve pocket 23. As a result, the fourth port 21 (further outlet) is also still not connected either to the third port 18 (inlet) or to the fifth port 24.

The valve slide 7 can be moved further in the second direction x2, so that the valve slide 7 moves out of the first control position and assumes a second control position. In the second control position, the third piston 31 no longer completely overlaps the fourth valve pocket 20. As a result, the third piston 31 releases the fourth valve pocket 20 via a leading edge 36 of the third piston 31, and so the fourth valve pocket 20 is connected to the third valve pocket 17. As a result, the third port 18 (inlet) is now also connected to the fourth port 21 (further outlet).

In the second control position as well, the second piston 30 enables the connection between the second valve pocket 14 and the third valve pocket 17 via the leading edge 35 of the second piston 30, and the third port 18 (inlet) remains connected to the second port 15 (outlet).

The valve slide 7 can be displaced within the valve body 6 with the aid of the spring force of the spring element 8 and with the aid of a hydraulic pilot force in the first axial direction x1. The hydraulic pilot force can be induced by a pressure prevailing within a primary system pressure circuit 43 of the hydraulic system 4. In the opposite direction, the valve slide 7 can be displaced within the valve body 6 in the second axial direction x2 with the aid of a hydraulic compressive force, which is induced by a pressure prevailing within a secondary system pressure circuit 39. The spring force, the pilot force, and the compressive force are explained in greater detail in the following.

On the first face end S1, the valve slide 7 forms a hydraulically effective end face 37, for example, a circular surface or an annular surface. In the starting position of the valve slide 7 according to FIG. 3, the hydraulically effective end face 37 is located within the first valve pocket 10. The first valve pocket 10 is connected to the secondary system pressure circuit 39 of the hydraulic system 4 via the first port 12 and via a first orifice 38.

Pressurized oil from the secondary system pressure circuit 39 can be fed to the first valve pocket 10 via the first orifice 38 and via the first port 12. The oil can fill the first valve pocket 10 and can build up a first pressure within the first valve pocket 10. A first compressive force corresponding to this first pressure can act on the hydraulically effective end face 37 of the first piston 29 within the first valve pocket 10 in the second direction x2 (therefore, counter to the spring force of the spring element 8 and counter to the pilot force).

Moreover, pressurized oil from the secondary system pressure circuit 39 can be fed to the third valve pocket 17 and the axial bore hole 11 in an area between the third valve pocket 17 and the fourth valve pocket 20 via the third port 18. The oil can fill the third valve pocket 17 and the axial bore hole 11 between the second piston 30 and the third piston 31 and can build up a second pressure within these two cavities. A second compressive force corresponding to this second pressure can act in the first axial direction x1 on an end face 40 of the second piston 30 and can act in the second axial direction x2 on an end face 41 of the third piston 31. Since, in the example shown in FIG. 3, the end face 40 of the second piston 30 has the same area value as the end face 41 of the third piston 31, the second compressive force does not bring about a displacement of the valve slide 7. The oil within the third valve pocket 17 is intended to be fed to the second valve pocket 14 (in the first control position and in the second control position of the valve slide 7) and to the third valve pocket 20 (in the second control position of the valve slide 7).

The sixth valve pocket 26 is connected to the primary system pressure circuit 43 of the hydraulic system 4 via the sixth port 27 and via a second orifice 42. Oil can be fed to the sixth valve pocket 26 and to the interior space 33 via the sixth port 27. The oil can fill the sixth valve pocket 26 and the interior space 33 and can build up a pilot pressure within the interior space 33. The pilot pressure acts on the inner hydraulically effective surface 34 of the fourth piston 32. A force corresponding to the pilot pressure acts in the first direction x1 on the inner hydraulically effective surface 34 of the fourth piston 32 and amplifies the spring force generated by the spring element 8.

The hydraulic system 4 according to FIG. 2 includes the aforementioned primary system pressure circuit 43, the secondary system pressure circuit 39, and a return section 44 for the closed-loop control of various pressures within the automatic transmission 3. The aforementioned three circuits 39, 43, and 44 can be saturated in order of priority.

Figure 4:
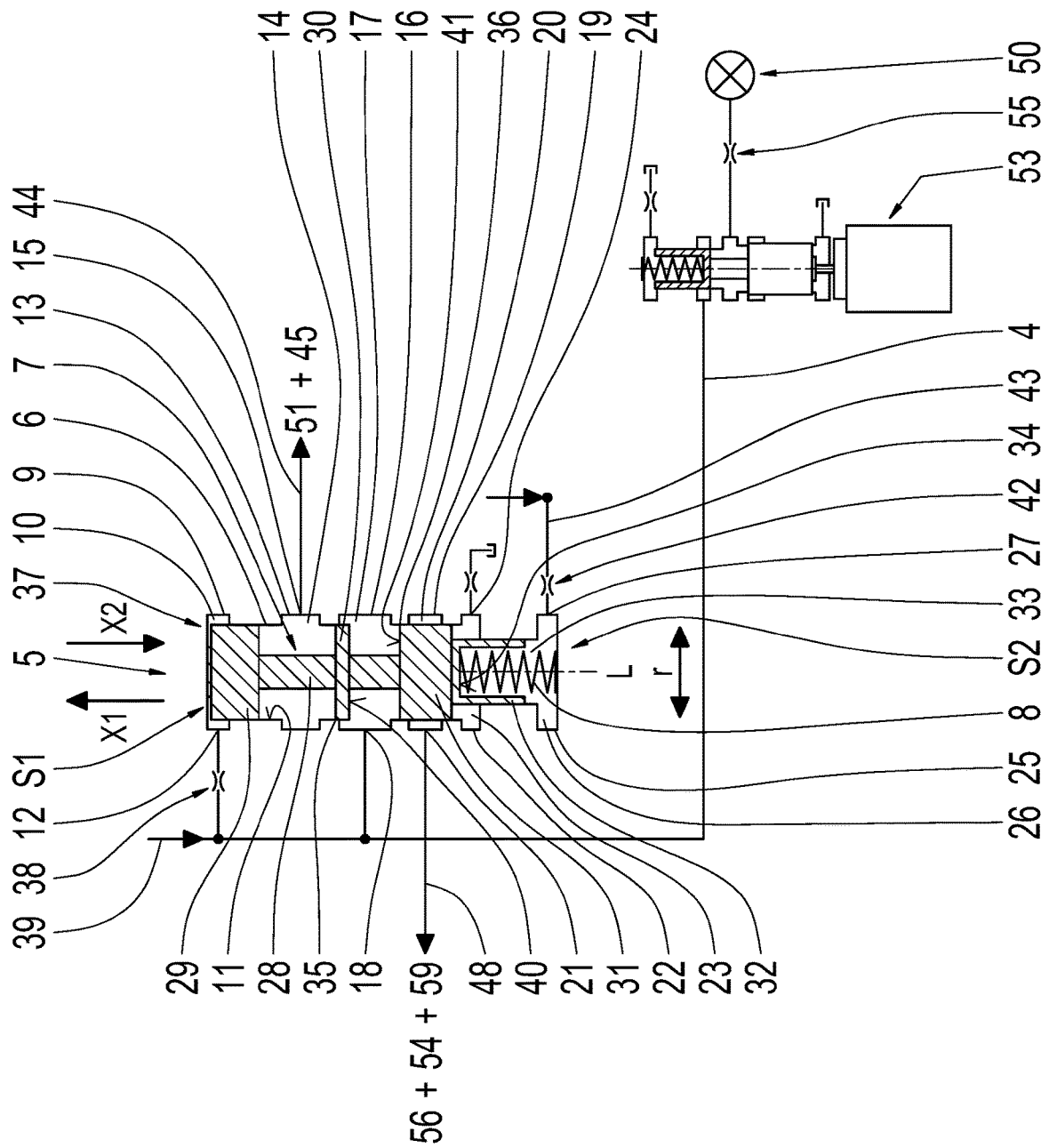
FIG. 4 shows a second exemplary embodiment of a cooling prioritization valve according to the invention for the hydraulic system according to FIG. 2, wherein the cooling prioritization valve according to FIG. 4 can replace the secondary system pressure valve according to FIG. 2.

The hydraulic system 4 can be supplied with hydraulic fluid, in particular with oil, by a primary pump in the form of a hydraulic pump 45 (cf. FIG. 4). The hydraulic pump 45 can deliver an amount of oil, which increases in proportion to the rotational speed of the hydraulic pump 45. The hydraulic pump 45 can be driven, in particular, by the internal combustion engine 2 (cf. FIG. 1). In order to reduce an input torque of the hydraulic pump 45, a so-called "2-circuit pump"—as shown with the aid of FIG. 2—can be utilized, in the case of which the pressure in a flood of a double-stroke vane pump is reduced as soon as the primary system pressure circuit 43 has been saturated (self-regulating system).

A primary system pressure prevailing within the primary system pressure circuit 43 can be adjusted by a primary system pressure valve 46, which is supplied with oil via the hydraulic pump 45. The pressure within the primary system pressure circuit 43 can be variably set with the aid of a first pressure regulator 47. As a first priority, the primary system pressure circuit 43 supplies clutches (not represented) of the automatic transmission 3 for transmitting the engine torque with pressurized oil for engaging the clutches. If this primary system pressure circuit 43 has been saturated, the secondary system pressure circuit 39 is supplied with oil (second priority). The secondary system pressure circuit 39 is divided into a section 48 for cooling and lubricating the transmission and into a section 49 for cooling a starting component 50.

The pressure within the secondary system pressure circuit 39 can be, for example, one third of the pressure prevailing within the primary system pressure circuit 43. When the secondary system pressure circuit 39 has also been saturated, an excess amount of oil delivered by the hydraulic pump 45 is directed into the return section 44 (which can also be referred to as suction loading), from where the oil is fed to a pump suction side 51 (third priority). In this case, the secondary system pressure valve 5' performs the task of a pressure control valve, wherein the excess amount of oil is directed to the suction loading 44 not via the primary system pressure valve 46, but rather via the secondary system pressure valve 5'.

A second pressure regulator 52, which controls the integrated starting component 50, is supplied with pressurized oil via the primary system pressure circuit 43. When the motor vehicle 1 starts, a large amount of heat input must be dissipated from the integrated starting component 50. For this reason, a certain flow of oil is utilized by the secondary system pressure circuit 39 for cooling the integrated starting component 50. The amount of oil can be controlled by a closed-loop system via a cooling valve 53.

As shown with the aid of FIG. 2, the amount of oil of the secondary system pressure circuit 39 is divided into a cooling oil flow, which flows to the integrated starting component 50, and into a cooling oil flow, which flows through a cooler 54 of the automatic transmission 3. Moreover, a lubrication section 59 of the secondary system pressure circuit 39 can branch off downstream from the cooler 54. The lubrication section 59 directs oil of the secondary system pressure circuit 39 to lubrication points of the transmission 3. Upon maximum actuation of the cooling valve 53, the splitting ratio of the cooling oil flows is determined by a ratio of a third orifice 55, which is arranged upstream or in front of the integrated starting component 50, and a fourth orifice 56, which is arranged upstream or in front of the cooler 54.

In order to make a certain cooling oil flow available to the integrated starting component 50, oil must also flow through the cooler 54 in accordance with the splitting ratio. These two flows, added together, yield the total secondary requirement, which is dependent on the pressure within the secondary system pressure circuit 39, which, in turn, is dependent on the pressure within the primary system pressure circuit 43. It is therefore possible to reduce the amount of oil for the integrated starting component 50 and, therefore, to increase the flow of oil through the cooler 54 with the aid of the cooling valve 53. On the other hand, it is not possible to reduce the oil flow through the cooler 54 (beyond the splitting ratio) and to increase the flow through the integrated starting component 50 with the aid of the hydraulic system 4 according to FIG. 2.

The integrated starting component 50 must be cooled to a great extent, in particular during starting processes. In this case, the output speeds in the transmission 3 are very low, which is why a high cooler through-flow (or lubrication) is not demanded. As described above, the cooler through-flow cannot be reduced (beyond the splitting ratio) with the aid of the hydraulic system 4, however, without also reducing the cooling of the integrated starting component 50. The secondary requirement has effects on the size of the oil pump (ccm per revolution), since a sufficient amount of secondary oil must be made available in the starting situations in order to provide the desired cooling of the integrated starting component 50. For example, a splitting ratio of orifice 55 to orifice 56 may equal one and a half (1.5). In order to make fifteen liters per minute (15 l/min) available for the integrated starting component 50, ten liters per minute (10 l/min) must flow through the cooler 54. The secondary requirement is therefore twenty-five liters per minute (25 l/min).

In order to improve the supply of the integrated starting component 50 with cooling oil, the secondary system pressure valve 5' according to FIG. 2 can be replaced in the hydraulic system 4 by a cooling prioritization valve 5 according to example aspects of the invention, for example, according to FIG. 3, 4, 5, or 6. As compared to the secondary system pressure valve 5', the cooling prioritization valve 5 includes an additional valve collar.

A prioritization of the cooling of the integrated starting component 50 can be established at the cooling prioritization valve 5. When the valve slide 7 of the cooling prioritization valve 5 is in the starting position, the total amount of oil flowing through the secondary system pressure circuit 39 is initially directed into the section 49 for cooling the integrated starting component 50 (cf., for example, FIG. 3).

Only when a specified amount of oil for cooling the integrated starting component 50 has been reached does a sufficient amount of pressure build up within the secondary system pressure circuit 39 in order to displace the valve slide 7 into the first control position of the valve slide 7. In the first control position, the second piston 30 of the valve slide 7 enables a connection between the second valve pocket 14 and the third valve pocket 17 of the cooling prioritization valve 5 via a leading edge 35 of the second piston 30. As a result, the third port 18 (inlet) is connected to the second port 15 (outlet). Since the third port 18 is connected to the secondary system pressure circuit 39, the secondary system pressure circuit 39, in the first control position of the valve slide 7, can supply the section 48 leading to the cooler 54 with oil. When the specified amount of oil for cooling the integrated starting component 50 is, for example, fifteen liters per minute (15 l/min), only these fifteen liters per minute (15 l/min) must be made available in the secondary system pressure circuit. An additional flow requirement for the cooler 54 does not arise.

If the cooling of the integrated starting component 50 is reduced after the starting process, more and more oil flows to the cooler 54. As soon as the section 48 to the cooler 54 has been saturated, the valve slide 7 of the cooling prioritization valve 5 moves into the second control position of the valve slide 7. In the second control position, the third piston 31 of the cooling prioritization valve 5 no longer completely overlaps the fourth valve pocket 20. As a result, the third piston 31 releases the fourth valve pocket 20 via the leading edge 36 of the third piston 31, and so the fourth valve pocket 20 is connected to the third valve pocket 17. As a result, the third port 18 (inlet) is now also connected to the fourth port 21 (further outlet). Therefore, in the second control position of the valve slide 7, the secondary system pressure circuit 39 can supply the suction loading 44 with oil.

FIG. 4 shows a further cooling prioritization valve 5, which differs from the cooling prioritization valve 5 according to FIG. 3 in that the section 48 leading to the cooler 54 is connected to the fourth port 21 (instead of to the second port 15, as shown with the aid of FIG. 3), and in that the suction loading 44 is connected to the second port 15 (instead of to the fourth port 21 as shown with the aid of FIG. 3). This can be easily implemented by changing control times at the valve slide 7. This example embodiment simplifies the installation situation of the cooling prioritization valve 5 within a hydraulic control unit.

Figure 5:
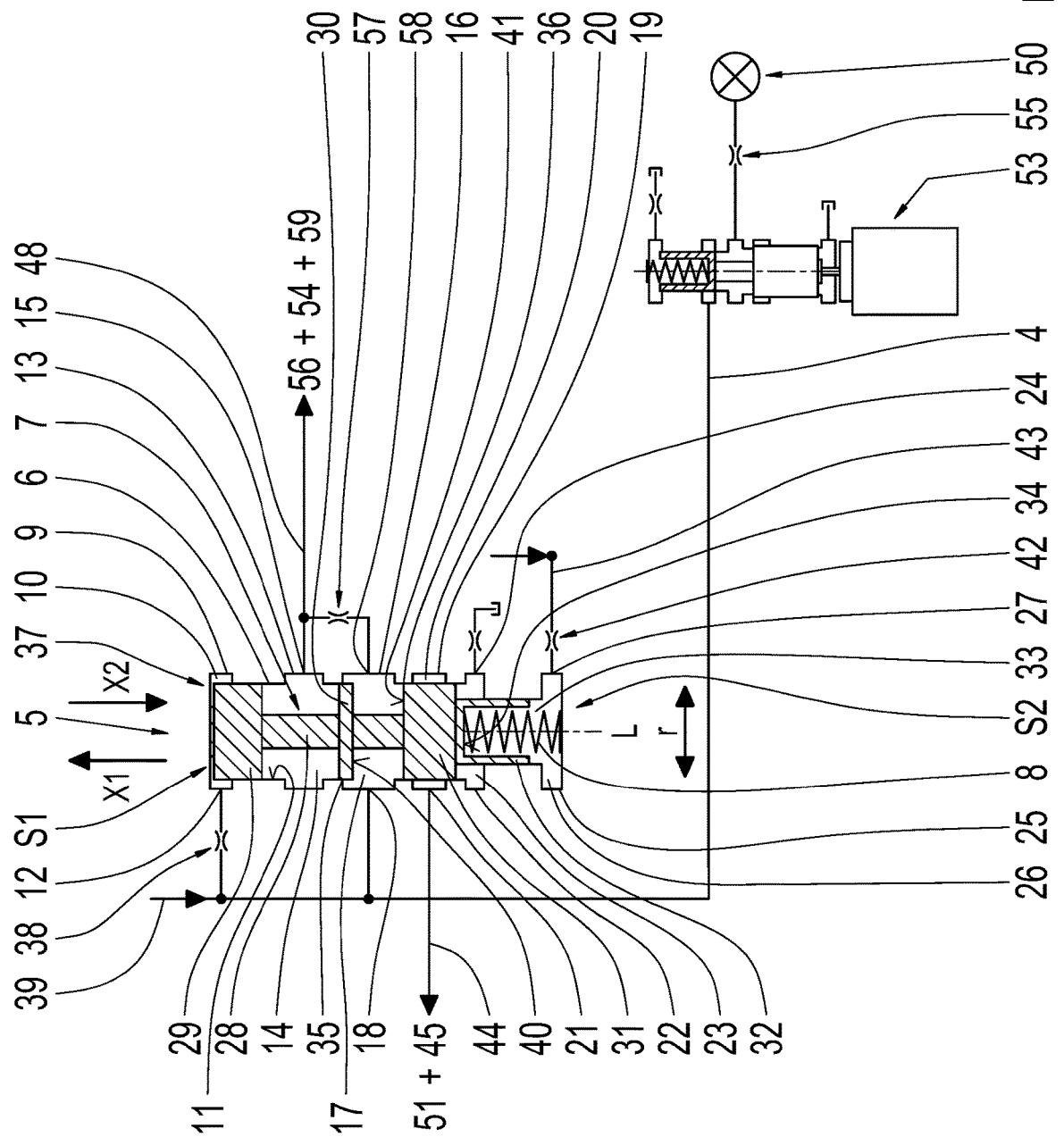
FIG. 5 shows a third exemplary embodiment of a cooling prioritization valve according to the invention for the hydraulic system according to FIG. 2, wherein the cooling prioritization valve according to FIG. 5 can replace the secondary system pressure valve according to FIG. 2.

FIG. 5 shows a further cooling prioritization valve 5, which differs from the cooling prioritization valve 5 according to FIG. 3 in that cooling prioritization valve 5 in FIG. 5 additionally includes a bypass orifice 57, which is connected on one side, via an additional port 58 on the third valve collar 16 of the valve housing 6, to the third valve pocket 17. The valve pocket 17 is supplied with oil from the secondary system pressure circuit 39 via the third port 18. On another side, the bypass orifice 57 is connected to the section 48 leading to the cooler 54 and to the lubrication 59 of the transmission 3. The bypass orifice 57 therefore allows for a minimal lubrication of the transmission even when the valve slide 7 of the cooling prioritization valve 5 is in the starting position. An amount of oil (for example, three liters per minute (3 l/min)) can be directed to the cooler 54 and to the lubrication 59 and, therefore, a dry-running of the transmission 3 can be prevented. Provided 15 l/min are required for the cooling of the integrated starting component 50, as in the aforementioned example, a total requirement of eighteen liters per minute (18 l/min) results, which still represents a savings of seven liters per minute (7 l/min) as compared to the known hydraulic system according to FIG. 2.

Figure 6:
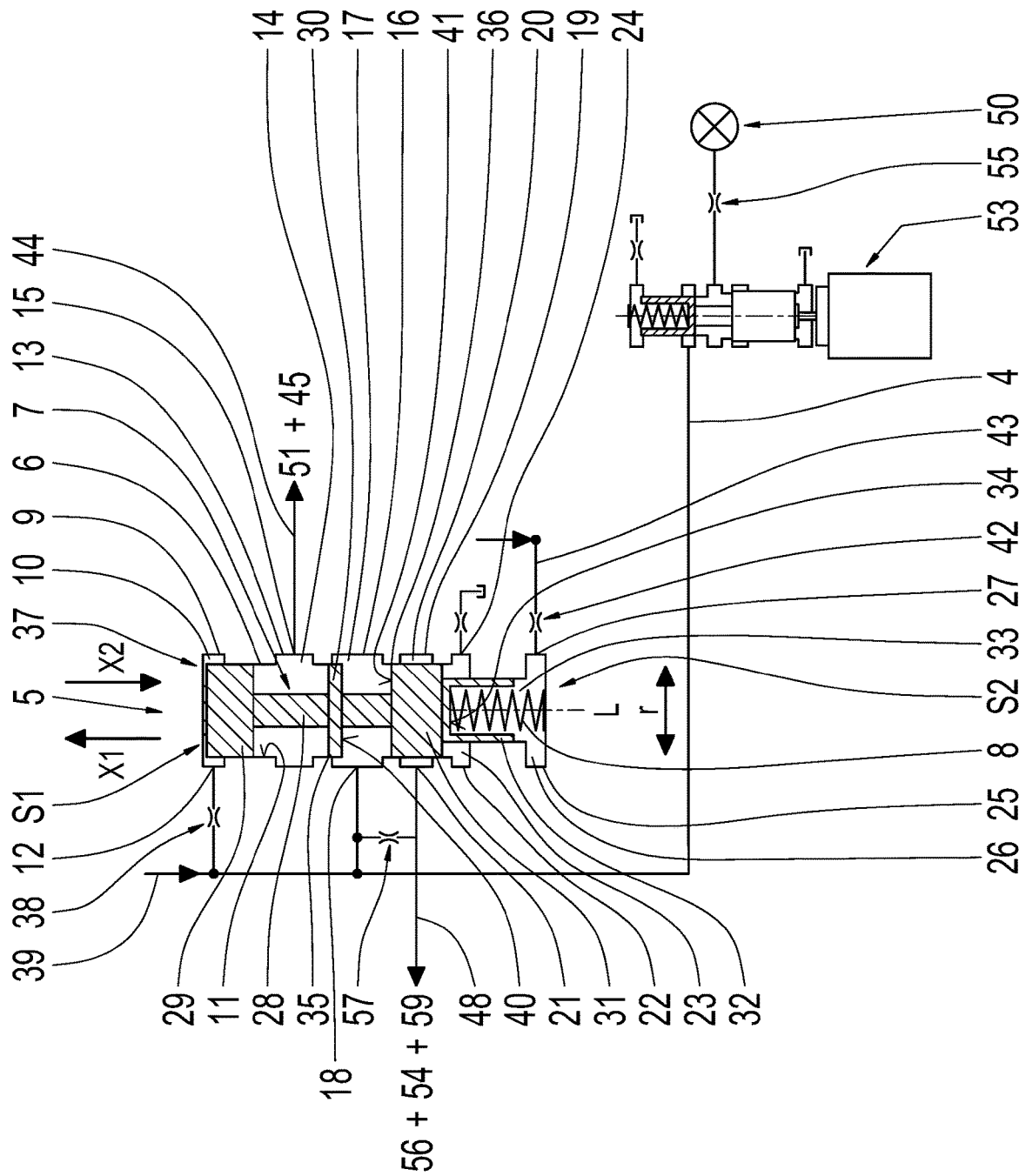
FIG. 6 shows a fourth exemplary embodiment of a cooling prioritization valve according to the invention for the hydraulic system according to FIG. 2, wherein the cooling prioritization valve according to FIG. 6 can replace the secondary system pressure valve according to FIG. 2.

FIG. 6 shows a further cooling prioritization valve 5, which differs from the cooling prioritization valve 5 according to FIG. 5 in that the section 48 leading to the cooler 54 and to the lubrication is connected to the fourth port 21 (instead of to the second port 15, as shown with the aid of FIG. 5), and in that the suction loading 44 is connected to the second port 15 (instead of to the fourth port 21 as shown with the aid of FIG. 5). This can be easily implemented by changing control times on the valve slide 7. This example embodiment simplifies the installation situation of the cooling prioritization valve 5 within a hydraulic control unit. Moreover, the bypass orifice 57 is still directly connected to the secondary system pressure circuit 39, on one side, in front of the third port 18. On the other side, the bypass orifice 57 is connected to the section 48 leading to the cooler 54 and to the lubrication of the transmission 3. The bypass orifice 57 therefore allows for a minimal lubrication of the transmission even when the valve slide 7 of the cooling prioritization valve 5 is in the starting position.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE SIGNS

B integrated starting component
L/r axial radial direction of a primary system pressure valve
S1/S2 first/second face end of the primary system pressure valve
1 motor vehicle
2 internal combustion engine
3 automatic transmission
4 hydraulic system
5 cooling prioritization valve
5' secondary system pressure valve
6 valve housing
7 valve slide
8 spring element
9 first valve collar
10 first valve pocket
11 axial bore hole within the valve housing
12 first port of the cooling prioritization valve
13 second valve collar
14 second valve pocket
15 second port of the cooling prioritization valve
16 third valve collar
17 third valve pocket
18 third port of the cooling prioritization valve
19 fourth valve collar
20 fourth valve pocket
21 fourth port of the cooling prioritization valve
22 fifth valve collar
23 fifth valve pocket
24 fifth port of the cooling prioritization valve
25 sixth valve collar
26 sixth valve pocket
27 sixth port of the cooling prioritization valve
28 piston rod
29 first piston
30 second piston
31 third piston
32 fourth piston
33 interior space
34 hydraulically effective surface
35 leading edge of the second piston
36 leading edge of the third piston
37 hydraulically effective end face
38 first orifice
39 secondary system pressure circuit
40 end face of the second piston
41 end face of the third piston
42 second orifice
43 primary system pressure circuit
44 return section/suction loading
45 hydraulic pump
46 primary system pressure valve
47 first pressure regulator
48 section for cooling and lubricating the transmission
49 section for cooling an integrated starting component
50 integrated starting component
51 pump suction side
52 second pressure regulator
53 cooling valve
54 cooler
55 third orifice
56 fourth orifice
57 bypass orifice
58 additional port on the third valve collar
59 lubrication section of the secondary system pressure circuit

The invention claimed is:

1. A cooling prioritization valve (5) for a hydraulic system (4) of a motor vehicle transmission (3), comprising:
a valve housing (6);

a valve slide (7);
an inlet (18);
an outlet (15); and
a further outlet (21),
wherein a secondary system pressure circuit (39) of the hydraulic system (4) is connectable to the inlet (18), a cooler (54) is connectable to the outlet (15) or to the further outlet (21), and a suction loading (44) is connectable to the outlet (15) or to the further outlet (21),
wherein the cooling prioritization valve (5) is configured for displacing the valve slide (7) within the valve housing (6) into each of a starting position, a first control position, and a second control position,
wherein the inlet (18) is not connected either to the outlet (15) or to the further outlet (21) in the starting position, the inlet (18) is connected to the outlet (15) in the first control position, and the inlet (18) is connected to the outlet (15) and to the further outlet (21) in the second control position, and
wherein the valve slide (7) forms a hydraulically effective surface (37) proximate a first face end (S1) of the valve slide (7) and a hydraulically effective surface (34) proximate a second face end (S2) of the valve slide (7), the valve slide (7) is displaceable within the valve housing (6) towards the starting position when a hydraulic force induced by a pressure prevailing within a primary system pressure circuit (43) of the hydraulic system (4) is applied at the hydraulically effective surface (34) proximate the second face end (S2) of the valve slide (7), and the valve slide (7) is displaceable within the valve housing (6) towards the first control position and the second control position when a hydraulic force induced by a pressure prevailing within the secondary system pressure circuit (39) is applied at the hydraulically effective surface (37) proximate the first face end (S1) of the valve slide (7).

2. The cooling prioritization valve (5) of claim 1, wherein:
the valve housing (6) comprises three valve collars (13, 16, and 19), and each of the three valve collars (13, 16, and 19) forms a valve pocket (14, 17, 20),
each of the inlet (19), the outlet (15), and the further outlet (21) are arranged on a respective one of the valve collars (13, 16, and 19), and
each of the inlet (19), the outlet (15), and the further outlet (21) are connected to a respective one of the valve pockets (14, 17, 20).

3. The cooling prioritization valve (5) of claim 1, wherein a piston rod (28) of the valve slide (7) comprises:
a piston (30); and
a further piston (31) arranged adjacent to and at an axial distance from the piston (30),
wherein, in the starting position, a valve pocket (17) connected to the inlet (18) is disconnected, by the piston (30) and the further piston (31), from a valve pocket (14) connected to the outlet (15) and from a valve pocket (20) connected to the further outlet (21),
wherein, in the first control position, the valve pocket (17) connected to the inlet (18) is connected to the valve pocket (14) connected to the outlet (15) and is disconnected, by the further piston (31), from the valve pocket (20) connected to the further outlet (21), and
wherein, in the second control position, the valve pocket (17) connected to the inlet (18) is connected both to the valve pocket (14) connected to the outlet (15) and to the valve pocket (20) connected to the further outlet (21).

4. The cooling prioritization valve (5) of claim 1, further comprising a restoring element (8) configured to preload the valve slide (7) towards the starting position.

5. A hydraulic system (4) for a motor vehicle transmission, comprising:
a cooling prioritization valve (5) comprising a valve housing (6), a valve slide (7), an inlet (18), an outlet (15), and a further outlet (21);
a secondary system pressure circuit (39);
an integrated starting component (50);
a cooler (54);
a bypass orifice (57);
a suction loading (44), which is connected to a suction side (51) of a pump (45) of the hydraulic system (4),
wherein the secondary system pressure circuit (39) is connected to the inlet (18),
wherein either the cooler (54) is connected to the outlet (15) and the suction loading (44) is connected to the further outlet (21), or the suction loading (44) is connected to the outlet (15) and the cooler (54) is connected to the further outlet (21),
wherein the integrated starting component (50) is connected to the secondary system pressure circuit (39), bypassing the cooling prioritization valve (5), and
wherein the secondary system pressure circuit (39) is connected to the cooler (54) via the bypass orifice (57).

6. The hydraulic system (4) of claim 5, wherein:
the cooler (54) is connected to the outlet (15) and the suction loading (44) is connected to the further outlet (21),
the bypass orifice (57) is connected to an additional outlet (58), the additional outlet (58) connected to the valve pocket (17) that is connected to the inlet (18), and
wherein the bypass orifice (57) is connected to a line section (48) leading to the cooler (54).

7. The hydraulic system (4) of claim 5, wherein:
the suction loading (44) is connected to the outlet (15) and the cooler (54) is connected to the further outlet (21);
the bypass orifice (57) is connected to the secondary system pressure circuit (39); and
the bypass orifice (57) is connected to a line section (48) leading to the cooler (54).

8. A motor vehicle automatic transmission (3), comprising the hydraulic system (4) of claim 5.

9. A motor vehicle (1), comprising the motor vehicle automatic transmission (3) of claim 8.

10. A hydraulic system (4) for a motor vehicle transmission, comprising:
a cooling prioritization valve (5) comprising a valve housing (6), a valve slide (7), an inlet (18), an outlet (15), and a further outlet (21);
a secondary system pressure circuit (39);
an integrated starting component (50);
a cooler (54);
a suction loading (44), which is connected to a suction side (51) of a pump (45) of the hydraulic system (4),
wherein the secondary system pressure circuit (39) is connected to the inlet (18),
wherein either the cooler (54) is connected to the outlet (15) and the suction loading (44) is connected to the further outlet (21), or the suction loading (44) is connected to the outlet (15) and the cooler (54) is connected to the further outlet (21), and
wherein the integrated starting component (50) is connected to the secondary system pressure circuit (39), bypassing the cooling prioritization valve (5), wherein the valve slide (7) displaceable within the valve housing (6) towards the starting position by a preload force of a restoring element (8) and by a hydraulic pilot force, the hydraulic pilot force induced by a pressure prevailing within a primary system pressure circuit (43) of the hydraulic system (4); and the valve slide (7) displaceable within the valve housing (6) towards the first control position and the second control position by a hydraulic compressive force, the hydraulic compressive force induced by a pressure prevailing within the second system pressure circuit (39).

\* \* \* \* \*